US00RE43694E

(19) United States
(12) Reissued Patent
Sawitowski

(10) Patent Number: US RE43,694 E
(45) Date of Reissued Patent: Oct. 2, 2012

(54) STAMPING TOOL, CASTING MOLD AND METHODS FOR STRUCTURING A SURFACE OF A WORK PIECE

(75) Inventor: Thomas Sawitowski, Wesel (DE)

(73) Assignee: Sharp Kabushiki Kaisha, Osaka (JP)

(21) Appl. No.: 12/213,990

(22) Filed: Jun. 26, 2008

Related U.S. Patent Documents

Reissue of:
(64) Patent No.: 7,066,234
Issued: Jun. 27, 2006
Appl. No.: 10/281,376
Filed: Oct. 28, 2002

U.S. Applications:
(63) Continuation-in-part of application No. PCT/EP02/07240, filed on Jul. 1, 2002, and a continuation-in-part of application No. PCT/EP01/04650, filed on Apr. 25, 2001.

(30) Foreign Application Priority Data

| | | |
|---|---|---|
| Apr. 28, 2000 | (DE) | 100 20 877 |
| Jul. 2, 2001 | (DE) | 101 31 513 |
| Nov. 9, 2001 | (DE) | 101 54 756 |

(51) Int. Cl.
*B22C 3/00* (2006.01)

(52) U.S. Cl. ..... 164/72; 164/138; 72/47; 205/223; 205/122

(58) Field of Classification Search ..... 164/72, 164/138; 72/47; 205/223, 122
See application file for complete search history.

(56) References Cited

U.S. PATENT DOCUMENTS

| | | | |
|---|---|---|---|
| 2,331,743 | A | 10/1943 | Sullivan |
| 2,849,192 | A | 8/1958 | Fairchild |
| 3,386,130 | A | 6/1968 | Grunewald et al. |
| 4,085,792 | A | 4/1978 | Eberle |
| 4,114,983 | A | 9/1978 | Maffitt et al. |
| 4,148,204 | A | 4/1979 | Dotzer et al. |
| 4,190,321 | A | 2/1980 | Dorer et al. |
| 4,240,257 | A | 12/1980 | Rakowsky et al. |
| 4,310,586 | A | 1/1982 | Sheasby et al. |
| 4,547,275 | A | 10/1985 | Ejima et al. |
| 4,581,913 | A | 4/1986 | Reed |
| 4,737,447 | A | 4/1988 | Suzuki et al. |
| 4,863,880 | A | 9/1989 | Fujisada |
| 5,150,231 | A | 9/1992 | Iwamoto et al. |
| 5,249,949 | A | 10/1993 | Aslam et al. |

(Continued)

FOREIGN PATENT DOCUMENTS

| | | |
|---|---|---|
| CA | 2407209 | 10/2002 |
| CH | 251451 | 8/1948 |
| CN | 251451 | 8/1948 |
| CN | 1078049 | 11/1993 |
| DE | 1108 536 | 6/1961 |

(Continued)

OTHER PUBLICATIONS

Kumao Ebihara. "Kinzoku Binran" (or "Metal Handbook"). Dec. 20, 1982, pp. 1311-1313, and Partial English Translation Thereof.

(Continued)

*Primary Examiner* — Kevin P Kerns
(74) *Attorney, Agent, or Firm* — Harness, Dickey & Pierce, P.L.C.

(57) ABSTRACT

A simple, cost-effective stamping or molding in the nanometer range is enabled using a stamping surface or molding face with a surface layer having hollow chambers that have been formed by anodic oxidation.

27 Claims, 2 Drawing Sheets

U.S. PATENT DOCUMENTS

| | | | |
|---|---|---|---|
| 5,318,091 | A | 6/1994 | Pavoni et al. |
| 5,415,219 | A | 5/1995 | Wiedenmann et al. |
| 5,425,848 | A | 6/1995 | Haisma et al. |
| 5,597,984 | A | 1/1997 | Mohaupt |
| 5,656,147 | A | 8/1997 | Ishimoto et al. |
| 5,693,208 | A | 12/1997 | Paulet |
| 5,693,210 | A | 12/1997 | Tomita et al. |
| 5,694,247 | A | 12/1997 | Ophey et al. |
| 5,808,707 | A | 9/1998 | Niibori et al. |
| 5,811,137 | A | 9/1998 | Clark et al. |
| 6,020,945 | A | 2/2000 | Sawai et al. |
| 6,089,848 | A | 7/2000 | Stefani |
| 6,090,523 | A | 7/2000 | Samoto et al. |
| 6,096,247 | A | 8/2000 | Ulsh et al. |
| 6,111,699 | A | 8/2000 | Iwata et al. |
| 6,139,713 | A | 10/2000 | Masuda et al. |
| 6,175,442 | B1 | 1/2001 | Booth, Jr. et al. |
| 6,266,112 | B1 | 7/2001 | Mizobata et al. |
| 6,348,960 | B1 | 2/2002 | Etori et al. |
| 6,354,358 | B1 | 3/2002 | Ishida |
| 6,359,735 | B1 | 3/2002 | Gombert et al. |
| 6,476,409 | B2 | 11/2002 | Iwasaki et al. |
| 6,568,931 | B2 | 5/2003 | Fujii et al. |
| 6,695,987 | B2 | 2/2004 | Katsumura et al. |
| 6,837,096 | B2 | 1/2005 | Stewart |
| 6,874,262 | B2 | 4/2005 | Nishiyama et al. |
| 6,888,676 | B2 | 5/2005 | Parikka et al. |
| 7,066,234 | B2 | 6/2006 | Sawitowski |
| 7,088,409 | B2 | 8/2006 | Itou et al. |
| 7,425,395 | B2 | 9/2008 | Tanno et al. |
| 7,835,080 | B2 | 11/2010 | Taguchi et al. |
| 2001/0035929 | A1 | 11/2001 | Nakamura et al. |
| 2001/0051442 | A1 | 12/2001 | Katsir et al. |
| 2002/0044351 | A1 | 4/2002 | Nilsen |
| 2002/0044356 | A1 | 4/2002 | Arakawa et al. |
| 2002/0089620 | A1 | 7/2002 | Yamamoto et al. |
| 2003/0067574 | A1 | 4/2003 | Sasaki et al. |
| 2003/0205475 | A1 | 11/2003 | Sawitowski |
| 2004/0159977 | A1 | 8/2004 | Perfetto et al. |
| 2004/0163441 | A1 | 8/2004 | Sawitowski |
| 2004/0219249 | A1 | 11/2004 | Chung et al. |
| 2005/0074579 | A1 | 4/2005 | Suzuki et al. |
| 2005/0093210 | A1 | 5/2005 | Umetani et al. |
| 2005/0104253 | A1 | 5/2005 | Katsumoto et al. |
| 2005/0150643 | A1 | 7/2005 | Chartouni et al. |
| 2005/0195486 | A1 | 9/2005 | Sasaki et al. |
| 2006/0050387 | A1 | 3/2006 | Arakawa et al. |
| 2006/0256263 | A1 | 11/2006 | Shimizu et al. |
| 2007/0014886 | A1 | 1/2007 | Hennessey et al. |
| 2007/0018345 | A1 | 1/2007 | Chao et al. |
| 2007/0159698 | A1 | 7/2007 | Taguchi et al. |
| 2008/0032058 | A1 | 2/2008 | Arakawa et al. |
| 2008/0102603 | A1 | 5/2008 | Kobayashi et al. |
| 2008/0129933 | A1 | 6/2008 | Nishida et al. |
| 2009/0211912 | A1 | 8/2009 | Taguchi et al. |
| 2009/0252825 | A1 | 10/2009 | Taguchi et al. |
| 2009/0256997 | A1 | 10/2009 | Misono et al. |
| 2009/0296021 | A1 | 12/2009 | Lee et al. |
| 2010/0033819 | A1 | 2/2010 | Schulz et al. |

FOREIGN PATENT DOCUMENTS

| | | | |
|---|---|---|---|
| DE | 19536194 | | 4/1997 |
| DE | 297 22 268 | | 4/1998 |
| DE | 297 22 268 | U1 | 4/1998 |
| DE | 19708776 | | 6/1998 |
| DE | 197 01 568 | | 7/1998 |
| DE | 197 01 568 | C1 | 7/1998 |
| DE | 197 27 132 | | 1/1999 |
| DE | 197 27 132 | C2 | 1/1999 |
| DE | 10020877 | | 10/2001 |
| DE | 102007009512 | | 8/2008 |
| EP | 0 481 753 | | 4/1992 |
| EP | 0 732 426 | | 9/1996 |
| EP | 0 732 426 | A1 | 9/1996 |
| EP | 0 792 951 | | 9/1997 |
| EP | 0 792 951 | A1 | 9/1997 |
| EP | 0 931 859 | | 7/1999 |
| EP | 0 931 859 | A1 | 7/1999 |
| EP | 1 016 621 | | 7/2000 |
| EP | 1 016 621 | A2 | 7/2000 |
| EP | 1 089 114 | | 4/2001 |
| EP | 1 473 594 | | 11/2004 |
| EP | 1 785 748 | | 5/2007 |
| EP | 1 972 997 | | 9/2008 |
| FR | 2 762 862 | | 11/1998 |
| FR | 2 762 862 | A1 | 11/1998 |
| GB | 2 266 599 | | 11/1993 |
| JP | 53-103754 | | 9/1978 |
| JP | 61-44607 | | 3/1986 |
| JP | 63303714 | | 12/1988 |
| JP | 02-254192 | | 10/1990 |
| JP | 3-203773 | | 9/1991 |
| JP | 4265729 | | 9/1992 |
| JP | 4565816 | | 9/1992 |
| JP | 05-016228 | | 1/1993 |
| JP | 5-016230 | | 1/1993 |
| JP | 5-323371 | | 12/1993 |
| JP | 6032675 | | 2/1994 |
| JP | 7-005693 | | 1/1995 |
| JP | 7-104272 | | 4/1995 |
| JP | 7-306408 | | 11/1995 |
| JP | 08025026 | | 1/1996 |
| JP | 08025026 | A | 1/1996 |
| JP | 08-085117 | | 4/1996 |
| JP | 8-321381 | | 12/1996 |
| JP | 9-073072 | | 3/1997 |
| JP | 9-155972 | | 6/1997 |
| JP | 9-322674 | | 12/1997 |
| JP | 10-016008 | | 1/1998 |
| JP | 10-046382 | | 2/1998 |
| JP | 10-068816 | | 3/1998 |
| JP | 10121292 | | 5/1998 |
| JP | 10-186136 | | 7/1998 |
| JP | 11-200090 | | 7/1999 |
| JP | 2000-52421 | | 2/2000 |
| JP | 2000-071290 | | 3/2000 |
| JP | 2000-199809 | | 7/2000 |
| JP | 2001-066626 | | 3/2001 |
| JP | 2001-074919 | | 3/2001 |
| JP | 2001-264520 | | 9/2001 |
| JP | 2001-517319 | | 10/2001 |
| JP | 2002-031721 | | 1/2002 |
| JP | 2002-079523 | | 3/2002 |
| JP | 2002-079535 | | 3/2002 |
| JP | 2002-107714 | | 4/2002 |
| JP | 2002-169025 | | 6/2002 |
| JP | 2002-318383 | | 10/2002 |
| JP | 2003-004904 | | 1/2003 |
| JP | 2003-043203 | | 2/2003 |
| JP | 2003-149413 | | 5/2003 |
| JP | 2003-302532 | | 10/2003 |
| JP | 2003-531962 | | 10/2003 |
| JP | 2003-319733 | | 11/2003 |
| JP | 2004-205990 | | 7/2004 |
| JP | 2004-223724 | | 8/2004 |
| JP | 2004-223836 | | 8/2004 |
| JP | 2004-272059 | | 9/2004 |
| JP | 2005-132660 | | 5/2005 |
| JP | 2005-144698 | | 6/2005 |
| JP | 2005-156695 | | 6/2005 |
| JP | 2005-161531 | | 6/2005 |
| JP | 2005-181740 | | 7/2005 |
| JP | 2005-234554 | | 9/2005 |
| JP | 2005-249982 | | 9/2005 |
| JP | 2005-338256 | | 12/2005 |
| JP | 2006-039450 | | 2/2006 |
| JP | 2006-062240 | | 3/2006 |
| JP | 2006-098623 | | 4/2006 |
| JP | 2006-208726 | | 8/2006 |
| JP | 2007-073696 | | 3/2007 |
| JP | 2007-086283 | | 4/2007 |
| JP | 2007-098742 | | 4/2007 |
| JP | 2007-156145 | | 6/2007 |
| JP | 2007-199522 | | 8/2007 |
| JP | 2007-203576 | | 8/2007 |
| JP | 2007-281099 | | 10/2007 |

| | | |
|---|---|---|
| JP | 2008-209867 | 9/2008 |
| JP | 2009-052147 | 3/2009 |
| JP | 2009-217278 | 9/2009 |
| JP | 4368384 | 11/2009 |
| WO | WO 98/39673 | 9/1998 |
| WO | WO 98/48996 | 11/1998 |
| WO | WO 03/073410 | 9/2003 |
| WO | WO 2005/050627 | 6/2005 |
| WO | WO 2006/043244 | 4/2006 |
| WO | WO 2006/059586 | 6/2006 |
| WO | WO 2006/059686 | 6/2006 |
| WO | WO 2007/040023 | 4/2007 |
| WO | WO 2008/082421 | 7/2008 |
| WO | WO 2009/107294 | 9/2009 |
| WO | WO 2009/147858 | 12/2009 |

OTHER PUBLICATIONS

S.J. Wilson et al. "The optical properties of 'moth eye' antireflection surfaces." Optica Acta, 1982, vol. 29, No. 7, pp. 993-1009.
Japanese Notice of Allowance for corresponding JP application 2001-580058.
Japanese Notice of Allowance for corresponding JP application 2008-303126.
Y.F. Chu et al. "Design of Pores in Alumina." Journal of Catalysis 41, 1976, pp. 384-396.
Hideki Masuda et al. "Fabrication of Porous $TiO_2$Films Using Two-Step Replication of Microstructure of Anodic Alumina." Jpn. J. Appl. Phys. vol. 31 (1992) pp. L17775-L17777, Part 2, No. 12B, Dec. 15, 1992.
Hideki Masuda et al. "Ordered Metal Nanohole Arrays Made by a Two-Step Replication of Honeycomb Structures of Anodic Alumina." Science, vol. 268, Jun. 9, 1995.
Hideki Masuda et al. "Preparation of microporous metal membranes by two-step replication of the microstructure of anodic alumina." Thin Solid Films, 223 (1993).
Hideki Masuda et al. "Fabrication of Gold Nanodot Array Using Anodic Porous Alumina as an Evaporation Mask." Jpn. J. Appl. Phys. vol. 35 (1996) pp. L126-L129, Part 2, No. 1B, Jan. 15, 1996.
P. Hoyer et al. "Electrodeposited nanoporous $TiO_2$ Film by a two-step replication process from anodic porous alumina." Journal of Materials Science Letters 15 (1996) 1228-1230.
Takashi Ohmori et al. "Impedance measurements of a Platinum Cylindrical Porous Electrode Replicated from Anodic Porous Alumina." J. Elecrochem, Soc. vol. 144, No. 4, Apr. 1997.
Hideki Masuda et al. "Highly ordered nanochannel-array architecture in anodic alumina." Appl. Phys. Lett, 71 (19) Nov. 10, 1997, pp. 2770-2772.
Hideki Masuda et al. "Fabrication of a Nanostructured Diamond Honeycomb Film." Adv. Mater. 2000, 12, No. 6, pp. 444-447.
Hideki Masuda et al. "Highly ordered metallic nanochannel-array architecture in anodic alumina." Solid State Physics (1996) vol. 31 No. 5, pp. 493-499, and partial English translation thereof.
Office Action for corresponding U.S. Appl. No. 13/064,157 dated Dec. 13, 2011.
International Preliminary Report on Patentability and Written Opinion for PCT/JP2008/002078 dated Mar. 4, 2010.
International Search Report for PCT/JP2009/007140, dated Aug. 25, 2011.
Office Action for U.S. Appl. No. 12/735,032 dated Nov. 8, 2010.
Masuda et al., Proceedings (Lecture Notes) of the 52nd joint lecture meeting of applied physics related societies (2005 spring in Saitama University) 30p-ZR-9, p. 112.
International Preliminary Report on Patentability and Written Opinion for PCT/JP2009/000739 dated Oct. 14, 2010.
International Search Report for PCT/JP2009/000739 mailed May 19, 2009.
International Search Report for PCT/JP2008/070307 mailed Jan. 27, 2009.
Office Action for U.S. Appl. No. 12/801,915 dated Oct. 18, 2010.
Office Action for U.S. Appl. No. 12/864,072 dated Feb. 14, 2011.
Office Action for Japanese patent application No. 2010-516713 dated Oct. 5, 2010.
Office Action for Japanese patent application No. 2010-516094 dated Sep. 14, 2010.
International Search Report for PCT/JP2009/070555 mailed Mar. 16, 2010.
International Preliminary Report on Patentability and Written Opinion for international patent application No. PCT/JP2009/002530 dated Jan. 20, 2011.
Office Action for corresponding U.S. Appl. No. 12/921,285 dated Mar. 16, 2011.
Kanamori et al., "100 nm period silicon antireflection structures fabricated using a porous alumina membrane mask," Applied Physics Letters, vol. 78, No. 2, Jan. 8, 2001, pp. 142-143.
"Standard Electrode Potential (data page)," Wikipedia, the free Encyclopedia, Anonymous, Feb. 10, 2011.
Office Action for U.S. Appl. No. 12/805,189 dated Apr. 13, 2011.
R.B.C. Cayless, "Alloy and Temper Designation Systems for Aluminum and Aluminum Alloys," AMS Handbook, vol. 2, ASM International, 1990, pp. 15-20.
Office Action for U.S. Appl. No. 12/992,705 dated Apr. 8, 2011.
Office Action for U.S. Appl. No. 12/735,032 dated Apr. 5, 2011.
Armin Plichta et al., "Flexible Glass Substrates," Flexible Flat Panel Display, Edited by G.P. Crawford, John Wiley & Sons, Ltd., XP002631694, pp. v-xvii, 35-45 and 48-55.
Office Action for U.S. Appl. No. 12/921,285 dated Jul. 12, 2011.
Office Action for U.S. Appl. No. 12/864,072 dated Jul. 5, 2011.
Office Action for U.S. Appl. No. 12/735,032 dated Aug. 26, 2011.
English Translation of the International Preliminary Report on Patentability (Chapter I) and Written Opinion for international application No. PCT/JP2009/007140 dated Aug. 25, 2011.
Office Action for U.S. Appl. No. 12/662,683 dated Oct. 5, 2011.
F.A. Lowenheim, "Electroplating," McGraw-Hill Book Company, New York, 1978, pp. 452-459.
H. Silman et al., "Protective and Decorative Coatings for Metals," Finishing Publication Ltd. Teddington, Middlesex, England, 1978, pp. 456-464.
S.J. Wilson, et al., "The optical properties of 'moth eye' antireflection surfaces," Optical ACTA, 1982, vol. 29, No. 7, pp. 993-1009.
Office Action for U.S. Appl. No. 12/805,189 dated Oct. 17, 2011.
Office Action for U.S. Appl. No. 12/733,055 dated Oct. 14, 2011.
Office Action for U.S. Appl. No. 12/662,682 dated Jun. 22, 2011.
Office Action for corresponding U.S. Appl. No. 12/992,705 dated Feb. 27, 2012.
Office Action for corresponding U.S. Appl. No. 12/662,682 dated Mar. 13, 2012.
Office Action for corresponding U.S. Appl. No. 12/733,055 dated Apr. 17, 2012.
Office Action for corresponding U.S. Appl. No. 12/735,032 dated Feb. 3, 2012.
Tatsuo Uchida et al., "Reflective Liquid-Crystal Displays," MRS Bulletin, vol. 27, No. 11, Nov. 1, 2002 (Nov. 1, 2002), pp. 876-879, XP55017950.
Office Action for corresponding U.S. Appl. No. 12/805,189 dated May 17, 2012.
Office Action for corresponding U.S. Appl. No. 12/662,683 dated May 31, 2012.
"Fabrication of Porous $TiO_2$Films using Two-Step Replication of Microstructure of Anodic Alumina" by Hideki Masuda et al., *Jpn. J. Appl. Phys.* vol. 31 (1992) pp. L17775-L17777, Part 2, No. 12B, Dec. 15, 1992.
"Ordered Metal Nanohole Arrays Made by a Two-Step Replication of Honeycomb Structures of Anodic Alumina" by Hideki Masuda et al., *Science,* vol. 268, Jun. 9, 1995.
"Preparation of microporous metal membranes by two-step replication of the mictrostructure of anodic alumina" by Hideki Masuda et al., *Thin Solid Films,* 223 (1993).
"Fabrication of Gold Nanodot Array Using Anodic Porous Alumina as an Evaporation Mask" by Hideka Masuda et al., *Jpn. J. Appl. Phys.* vol. 35 (1996) pp. L126-L179, Part 2, No. 1B, Jan. 15, 1996.
"Electrodeposited nanoporous $TiO_2$ film by a two-step replication process from anodic porous alumina" by P. Hoyer et al., *Journal of Materials Science Letters* 15 (1996) 1128-1230.
"Impedance measurements of a Platinum Cylindrical Porous Electrode Replicated from Anodic Porous Alumia", by Takashi Ohmori et al, *J. Electrochem, Soc.,* vol. 144, No. 4, Apr. 1997.
"Highly ordered nanochannel-array architechture in anodic alumina" by Hideki Masuda et al., *Appl. Phys. Lett,* 71 (19), Nov. 10, 1997.
"Fabrication of a Nanostructured Diamond Honeycomb Film" by Hideki Masuda et al., *Adv. Matter. 2000,* 12, No. 6.

STAMPING TOOL, CASTING MOLD AND METHODS FOR STRUCTURING A SURFACE OF A WORK PIECE

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of International Patent Application No. PCT/EP02/07240 filed Jul. 1, 2002, which designated the United States and of International Patent Application No. PCT/EP01/04650 Apr. 25, 2001 which designated the United States.

BACKGROUND OF THE INVENTION

1. Field of the Invention

The present invention relates to a stamping tool having a structured stamping surface, a casting mold, a method for producing a stamping tool or a casting mold having a structured stamping surface, and methods for structuring a surface of a work piece.

2. Description of Related Art

Stamping constitutes a non-cutting manufacturing method for producing a relief-like or structured surface on a work piece. A stamping tool with a profiled or structured stamping surface is used for this. The stamping surface is pressed with such a stamping force onto the surface to be structured of the work piece or rolled on it, so that the work piece becomes plastic and flows into depressions in the stamping tool or the stamping surface. Due to the considerable stamping forces employed, the stamping tool and the stamping surface are usually made of metal.

Further, molding is known. A casting mold with a structured molding face can be used for producing a cast work piece with a structured surface by casting.

In the present invention, nanometer range is understood to mean profiling or structuring with structural widths of less than 1000 nm, especially of less than 500 nm. The structural width designates the dimension by which individual structural elements, such as bumps, are repeated, that is, for example, the average distance of adjacent bumps from one another or of depressions from one another.

It is very expensive to manufacture a stamping tool with a very finely structured or profiled stamping surface. To create a so-called "moth eye structure"—evenly arranged, egg carton-like bumps—or fine grooves in the nanometer range, it is known from practice to use a lighting pattern with periodic intensity modulation for illuminating photosensitive material via two interfering laser beams. After the illuminated material develops, a periodic surface structure results, which is molded into other materials using various replication methods and finally into nickel, for example, by electroforming. This type of manufacturing is very expensive and is suited only for structuring even surfaces.

In the nanometer range, lithographic methods for structuring a stamping surface of a stamping tool can still only be used in a limited way. It should be noted here that the wavelength of the visible light alone is already 400 to 750 nm. In each case, lithographic methods are very costly.

German Patent DE 197 27 132 C2 discloses the manufacturing of a stamping tool by means of electrolytic machining.

During electrolytic machining, a metallic stamping surface of the stamping tool is treated electrolytically, wherein, being an anode in a fast-flowing electrolyte, the metal of the stamping surface is located at a minimal distance opposite a cathode and is dissolved in surface terms. The metal or the stamping surface contains the structure determined by the form of the cathode, and the cathode thus forms a recipient vessel that is shaped electrochemically. German Patent DE 197 27 132 C2 also provides the use of a cylindrical rotation electrode, whose covering surface presents a negative form of the desired stamping structure. Here, too, there is considerable expense involved and structuring in the nanometre range is at least only partly possible.

The use of anodally oxidized surface layers made of aluminum or magnesium in casting molds to increase resistance is known from Swiss Patent CH 251 451. However, the forming of hollow chambers by oxidation for structuring a molded article in the nanometer range is not disclosed.

Forming hollow chambers by anodic oxidation of aluminum is described in published European Patent Application EP 0 931 859 A1, for example.

However, the related art does not provide a cost-effective solution to production of a work piece, like a stamped piece, or casting with a surface structured in the nanometer range.

Consequently, there is a need for a stamping tool, a casting mold, a method for manufacturing a stamping tool or a casting mold, a method for structuring a surface of a work piece and a method for using a surface layer provided with open hollow chambers, wherein structuring in the nanometer range is enabled in a simple and cost-effective manner.

SUMMARY OF INVENTION

A primary object of the present invention is to provide a stamping tool, a casting mold, a method for manufacturing a stamping tool or a casting mold, a method for structuring a surface of a work piece and a method for using a surface layer provided with open hollow chambers, wherein structuring in the nanometer range is enabled in a simple and cost-effective manner.

One aspect of the present invention is to use a porous oxide layer, and especially a surface layer, formed via anodic oxidation and provided with open hollow chambers, as stamping surface of a stamping tool. This leads to several advantages.

First, an oxide layer, especially the preferably provided aluminum oxide, is relatively hard. With respect to the often very high stamping forces, this is an advantage for being able to stamp work pieces of various materials and for achieving a long tool life of the stamping tool.

Second, model-free oxidation is very easy and cost-effective to carry out. In particular, producing hollow chambers is (quasi) independent of the form and configuration of the cathodes employed, so a model or negative form is not required, as in electrolytic machining.

Third, the provided model-free forming of open hollow chambers via anodic oxidation enables structures to be manufactured in the nanometer range very easily and cost-effectively. In particular, structural widths of 500 nm and less, even 100 nm and less are possible.

Fourth, depending on choice of procedural conditions the configuration—regular or irregular—and the surface density of the hollow chambers can be varied as required.

Fifth, likewise, by simply varying the procedural conditions—especially by variation of the voltage during anodizing—the form of the hollow chambers, and thus, the structure of the stamping surface, can be adjusted and varied.

Sixth, the anodally oxidized surface layer can be used directly, thus without further molding, as the stamping surface of a stamping tool.

A further aspect of the present invention is to use a porous oxide layer, and especially a surface layer with open hollow chambers, formed by anodic oxidation directly or model-free, thus independent of a cathode form, as molding face or inner face of a casting mold. This has a number of advantages.

First, an oxide layer, especially the preferably provided aluminum oxide, is relatively hard. With respect to the often very high forces utilized in casting or molding, this is an advantage for being able to produce work pieces of various materials and for achieving a long shelf life of the casting mold.

Second, the model-free oxidation is very easy and cost-effective to carry out. Producing hollow chambers is (quasi) independent on the form and configuration of the cathodes used, and a model or negative form is therefore not required.

Third, the model-free forming of open hollow chambers as provided via anodic oxidation enables structures to be manufactured in the nanometer range very easily and cost-effectively. In particular, structural widths of 500 nm and less, even 100 nm and less are possible.

Fourth, depending on choice of procedural conditions the configuration—regular or irregular—and the surface density of the hollow chambers can be varied as required.

Fifth, likewise, by simply varying the procedural conditions—especially by variation of the voltage during anodizing—the form of the hollow chambers, and thus, the structure of the surface can be adjusted and varied.

Sixth, the anodally oxidized surface layer can be used directly, thus without further molding, as the surface of a casting mold.

Further advantages, properties, features and goals of the present invention will emerge from the following description of preferred embodiments with reference to the drawings.

DETAILED DESCRIPTION OF THE INVENTION

Figure 1:
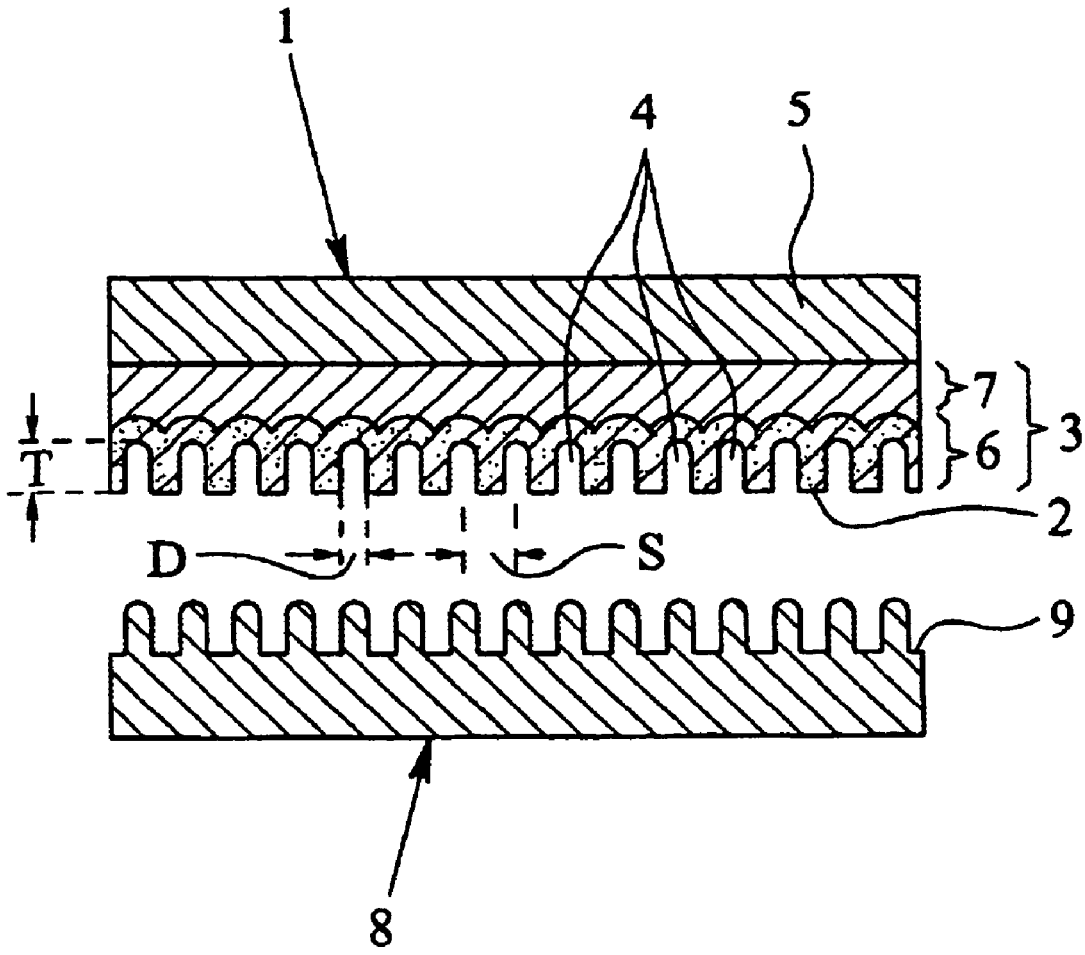
FIG. 1 is a very schematic sectional elevation of a stamping tool and a work piece structured therewith according to a first embodiment.

In a highly simplified sectional elevation, FIG. 1 shows a proposed stamping tool 1 with a structured, i.e., profiled or relief-like, stamping surface 2. The stamping surface 2 is formed by a side of a surface layer 3 which is provided with open hollow chambers 4 produced by anodic oxidation or an originally flat surface.

In the illustrative example, the surface layer is applied to a support 5 of the stamping tool 1. For example, the surface layer 3 is applied to the support 5 by plasma coating. However, the surface layer 3 can also be formed directly by the support 5, and thus can be a surface area of the support 5.

It is understood that the surface layer 3 can also be deposited on the support 5 using other methods.

In the illustrative example, the surface layer 3 preferably is made of aluminum which is applied to the support 5, especially via plasma coating, and adheres well to the support 5, which is preferably made of metal, especially iron or steel.

The surface layer 3 is at least partially anodally oxidized in the illustrative example, to the depth of a covering layer 6, whereby the hollow chambers 4 are formed in the surface layer 3. The hollow chambers 4 are formed immediately and/or without any model or pattern, i.e., the arrangement, distribution, form and the like of the hollow chambers 4—as opposed to electrolytic machining—is, thus, at least essentially independent of the surface shape and the proximity of the cathode (not shown) used in oxidation. Moreover, according to the invention, the "valve effect," namely the occurring, independent formation of hollow chambers 4 during oxidation or anodization of the surface layer 3—at least in particular in the so-called valve metals—is used. This immediate or undefined formation of the hollow chambers 4 does not preclude an additional (before or after) formation or structuring of the stamping surface 2 or the hollow chambers 4 by means of a negative form.

Depending on how completely or how deeply the surface layer 3 is oxidized, or whether the surface layer 3 is formed directly by the support 5, the surface layer 3 can correspond to the oxidized covering layer 6. In this case, for example, the intermediate layer 7, which is comprised of aluminum in the illustrative example, and which promotes very good adhesion between the covering layer 6 and the support 5, can be omitted.

For example, according to an alternative embodiment, the uncoated support 5 can be oxidized anodally on its surface forming the stamping surface 2 by formation of a porous oxide layer or hollow chambers 4. This is possible, for example, for a support 5 made of iron or steel, especially stainless steel. In this case, the surface layer 3 then corresponds to the covering layer 6, i.e., the oxidized layer.

Aluminum and iron or steel, especially stainless steel, have already been named as particularly preferred materials, used at least substantially for forming the anodally oxidized surface layer 3 or the covering layer 6. However, silicon and titanium as well as other valve metals, for example, can also be used.

In the illustrative example, the proportions in size are not presented true to scale. The stamping tool 1 or its stamping surface 2 preferably has a structural width S in the nanometer range, especially from 30 to 600 nm and preferably from 50 to 200 nm.

The hollow chambers 4 or their openings have an average diameter D of essentially 10 to 500 nm, preferably 15 to 200 nm and especially 20 to 100 nm.

In the illustrative example, the hollow chambers 4 are designed essentially lengthwise, wherein their depth T is preferably at least approximately 0.5 times the above-mentioned, average diameter D and especially approximately 1.0 to 10 times the diameter D.

Here, the hollow chambers 4 are designed at least substantially similarly in shape. In particular, the hollow chambers 4 are designed substantially cylindrically. However, the hollow chambers 4 can also present a form deviating therefrom, for example, they can be designed substantially conically.

In general, the hollow chambers 4 can also have a cross-section varying in its depth T, form and/or diameter. In addition to this, the hollow chambers 4 can be designed substantially conically as a rough structure, for example, and can be provided along their walls with many fine depressions (small hollow chambers) to form a fine structure in each case.

The hollow chambers 4 are preferably distributed at least substantially uniformly over the surface of the surface layer 3 or over the stamping surface 2. However, uneven distribution is also feasible.

The hollow chambers or their openings are preferably distributed over the stamping surface 2 with a surface density of $10^9$ to $10^{11}/cm^2$. In the illustrative example, the surface density is substantially constant over the stamping surface 2. However, the surface density can also vary partially on the stamping surface 2 as required.

The area of the openings of the hollow chambers 4 is, at the most, preferably 50% of the extension area of the stamping surface 2. A sufficiently high stability or carrying capacity of the stamping surface 2 or the surface layer 3/covering layer 6 is hereby achieved with respect to the high stresses arising during the stamping.

In general, the form, configuration, surface density and the like of the hollow chambers 4 can be controlled by corresponding choice of the procedural conditions during anodic oxidation. For example, with oxidation of aluminium under potentiostatic conditions—with at least substantially constant voltage—an at least substantially even cross-section of the hollow chambers 4 is achieved over their depth T, i.e., an at least substantially cylindrical form. Accordingly, the form of the hollow chambers 4 can be influenced by varying the voltage. For example, galvanostatic oxidation—i.e., at an at least substantially constant current—leads to a somewhat conical or hill-like form of the hollow chambers 4, so that a type of "moth eye structure" or the like can be formed in this way. The surface density of the hollow chambers 4, i.e., the number of hollow chambers 4 per surface unit of the stamping surface 2, depends inter alia on the voltage and the current during anodizing.

As required, the hollow chambers 4 can vary in their form, depth and/or surface density over the stamping surface 2, especially partially, and/or be designed only partly on the stamping surface 2.

If required, the stamping surface 2 can also be modified before and/or after oxidation—creation of the hollow chambers 4—for example, via a lithographic process, etching and/or other, preferably material-stripping methods, for example, to create a rough structure in the form of paths, ridges, areas with or without hollow chambers 4, large-surface bumps or depressions and the like on the stamping surface 2.

Chemical sizing, especially by partial etching of oxide material, can also be carried out to modify the stamping surface 2 or the hollow chambers 4. In this way, the surface ratio of the opening surfaces of the hollow chambers 4 to the extension area of the stamping surface 2 can be varied or increased. It is understood that other modifications of the stamping surface 2 or of the hollow chambers 4 can also be made, depending on reaction time and intensity.

A particular advantage of the proposed solution is that the stamping surface 2 can also be designed in a curved manner, for example, cylindrically, bulged, lenticular, or hemispherical. In particular, the stamping surface 2 can have practically any shape at all. Compared to the prior art, it is thus not necessary that the stamping surface 2 or the surface of the surface layer 3/covering layer 6 is at least substantially even.

The figure also shows a work piece 8, likewise in a highly simplified, not true-to-scale, sectional diagram, in the already stamped state, i.e., with a surface 9 already structured by the stamping tool 1. Stamping takes places especially by the stamping tool 1 being pressed with a corresponding stamping force onto the surface 9 of the work piece 8 to be structured, so that the material of the work piece 8 flows at least partially into the hollow chambers 4. Here, it is not necessary that the work piece 8, as illustrated diagrammatically in the figure, is designed in a monobloc manner. Instead, the work piece 8 can also present another type of surface layer or surface coating or the like, not illustrated here, which forms the surface 9 and is structured or designed in a relief-like manner by means of the stamping tool 1.

Instead of the stamp-like embossing, the stamping tool 1 can be unrolled with corresponding shaping/form of the stamping surface 2 and/or the surface 9 to be structured. By way of example, the stamping surface 2 and/or the surface 9 to be structured can be designed in a curved manner—for example, cylindrically—or in a bulged manner, to enable reciprocal unrolling for structuring the surface 9.

Both a die stamping process and also a rolling stamp process can be realized with the proposed solution.

Furthermore, the proposed solution can be used for embossing as well as closed-die coining or coining. A corresponding abutment for the work piece 8 or a corresponding countertool is not illustrated for clarification purposes.

The proposed stamping tool 1 allows very fine structuring of the work piece 8 or its surface 9. If needed, the work piece 8 or the surface 9 can also be profiled or structured repeatedly, first with a rough structured stamping tool—optionally manufactured also in customary fashion—and then with the finer structured stamping tool 1 proposed here. A lower stamping force is employed, especially during the second stamping procedure using the finer stamping tool 1 and/or, in an intermediate step, the surface 9 is hardened in order not to fully neutralize the rough structure produced at first stamping, but to achieve superposition from the rough structure and the fine structure of both stamping tools. Thus, it is possible, for example, to create on the surface 9 relatively large bumps of the order of 0.1 to 50 μm, each with several, relatively small protrusions, for example, of the order of 10 to 400 nm, on the surface 9 of the work piece 8.

The proposed solution very easily and cost-effectively enables very fine structuring of the surface 9. Accordingly, there is a very broad area of application. For example, such especially very fine structuring can be utilized in anti-reflex layers, for altering radiation emission of structured surfaces, in sensory analysis, in catalysis, in self-cleaning surfaces, in improving surface wettability and the like. In particular, the proposed solution also extends to the use of work pieces 8 with structured surfaces 9 that have been structured by use of the proposed stamping tool 1 for the purposes mentioned hereinabove.

In particular, the proposed solution is suited for stamping synthetic materials—for example, PMMA (polymethyl methacrylates), [Teflon] *TEFLON* or the like, metals—for example, gold, silver, platinum, lead, indium, cadmium, zinc or the like, polymer coatings—for example, paints, dyes or the like, and inorganic coating systems etc.

Expressed in general terms, an essential aspect of the present invention according to the first embodiment is using a surface layer with hollow chambers formed by anodic oxidation as a bottom die or upper die, to enable surface structuring in the nanometer range.

Now, the second embodiment of the present invention is discussed with reference to FIG. 2.

Figure 2:
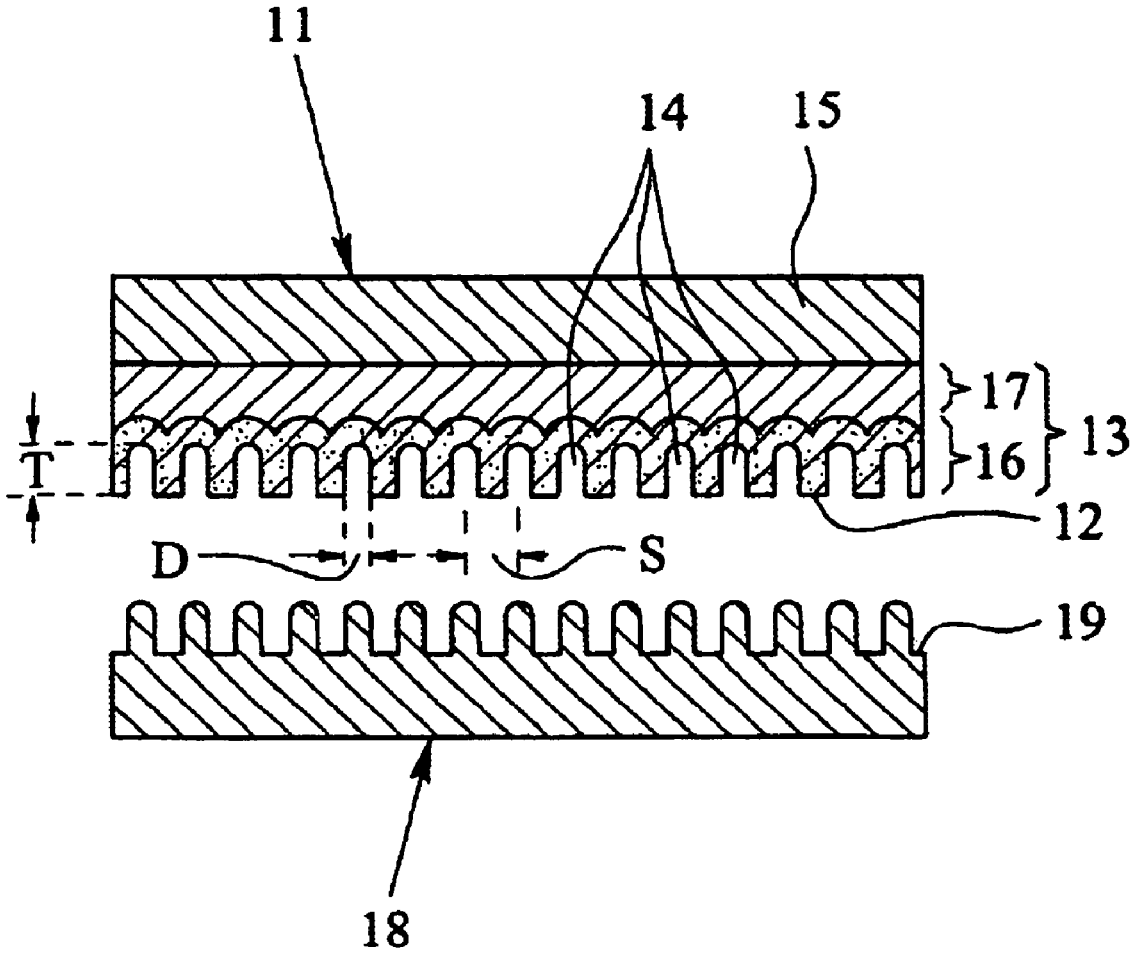
FIG. 2 is a very schematic sectional elevation of a proposed casting mold and a work piece structured therewith according to an second embodiment.

In a highly simplified partial sectional elevation, FIG. 2 shows a proposed casting mold 11 with an at least partially structured, thus profiled or relief-like inner face or molding face 12. The face 12 is formed by a top or flat side of a surface layer 13 that is provided with open hollow chambers 14 produced by anodic oxidation.

In the illustrative example, the surface layer 13 is applied to a support 15 of the casting mold 11. For example, the surface layer 13 is applied to the support 15 by plasma coating. However, the surface layer 13 can also be formed directly by the support 15, and thus can be a surface area of the support 15.

It is understood that the surface layer 13 can also be deposited on the support 15 using other methods.

In the illustrative example, the surface layer 13 preferably comprises aluminum, which is applied to the support 15 especially via plasma coating, and adheres well to the support 15 that is preferably made of metal, especially iron or steel.

The surface layer 13 is at least partially anodally oxidized, in the illustrative example, to the depth of a covering layer 16, by means of which the hollow chambers 14 are formed in the surface layer 13 or covering layer 16. The hollow chambers 14 are formed directly or model-free, that is, the configuration, distribution, form and the like of the hollow chambers 14 is, compared to electrolytic machining, therefore at least substantially dependent on the surface shape and proximity of the cathodes (not illustrated here) used during oxidation. Rather, the 'valve effect' is made use of here, as per the invention, namely the automatic development of the hollow chambers 14 occurring during oxidation or anodizing of the surface layer 13, at least especially with so-called valve metals. Such direct and model-free production of the hollow chambers 14 does not exclude additional (prior or subsequent) forming or structuring of the face 12 or of the hollow chambers 14 by a negative form.

Depending on how completely or how deeply the surface layer 13 is oxidized, or whether the surface layer 13 is formed directly by the support 15, the surface layer 13 can correspond to the oxidized covering layer 16. In the illustrative example, in this case, for example, the intermediate layer 17, which is comprised of aluminum and which promotes very good adhesion between the covering layer 16 and the support 15, can be omitted.

For example, according to a design alternative the uncoated support 15 can be oxidized anodally on its surface forming the face 12 by formation of a porous oxide layer or hollow chambers 14. This is possible for example, for a support 15 made of iron or steel, especially stainless steel. In this case the surface layer 13 then corresponds to the covering layer 16, i.e., the oxidized layer.

Aluminum and iron or steel, especially stainless steel, have already been named as particularly preferred materials, used at least substantially for forming the anodally oxidized surface layer 13 or the covering layer 16. However, silicon and titanium as well as other valve metals for example, can also be used.

In the illustrative example, the proportions in size are not presented true to scale. The face 12 preferably has a structural width S in the nanometer range, especially of 130 to 600 nm and preferably of 50 to 200 nm. The hollow chambers 14 or their openings have an average diameter D of essentially 10 to 500 nm, preferably 15 to 200 nm and especially 20 to 100 nm. In the illustrative example, the hollow chambers 14 are designed essentially lengthwise, wherein their depth T is preferably at least approximately 0.5 times the above-mentioned, average diameter D and especially approximately 1.0 to 10 times the diameter D.

The hollow chambers 14 are designed, here, at least substantially identically. In particular, the hollow chambers 14 are designed substantially cylindrically. However, the hollow chambers 14 can also present a form deviating therefrom, for example, they can be designed substantially conically.

In general the hollow chambers 14 can also have a cross-section varying in its depth T in form and/or diameter. In addition to this, the hollow chambers 14 can be designed substantially conically as a rough structure, for example, and can be provided with many fine depressions (small hollow chambers) along their walls to form a fine structure in each case.

The hollow chambers 14 are preferably distributed at least substantially uniformly over the surface of the surface layer 13 or over the face 12. However, uneven distribution is also feasible.

The hollow chambers or their openings are preferably distributed with a surface density of $10^9$ to $10^{11}$/cm. In the illustrative example, the surface density is substantially constant over the face 12. However, the surface density can also vary selectively on the surface 12 as required.

The area of the openings of the hollow chambers 14 is at the most preferably 50% of the extension area of the face 12. A sufficiently high stability or carrying capacity of the face 12 or the surface layer 13/covering layer 16 is thereby achieved with respect to the high stresses arising partially from molding or casting.

In general, the form, configuration, surface density and the like of the hollow chambers 14 can be controlled by corresponding choice of the procedural conditions during anodic oxidation. For example, with oxidation of aluminium under potentiostatic conditions—i.e., at least at substantially constant voltage—an at least substantially uniform cross-section of the hollow chambers 14 is achieved over their depth T, i.e., an at least substantially cylindrical form. Accordingly, the form of the hollow chambers 14 can be influenced by varying the voltage. For example, galvanostatic oxidation, i.e., at an at least substantially constant current, leads to a somewhat conical or hill-like form of the hollow chambers 14, so that a type of "moth eye structure" or the like can be formed in this way. The area density of the hollow chambers 14, i.e., the number of hollow chambers 14 per area unit on the face 2, depends inter alia on the voltage and the current during anodizing.

As required, the hollow chambers 14 can vary in their form, depth and/or surface density over the face 2, especially partially, and/or be designed only partially on the face 12.

And, if required, the face 12 can also be modified before and/or after oxidation—thus, creation of the hollow chambers 14—for example, via a lithographic process, etching and/or other, preferably material-stripping methods, for example, to create a rough structure in the form of paths, ridges, areas with or without hollow chambers 14, large-surface bumps or depressions and the like on the face 12.

Mechanical processing and/or chemical sizing, especially by partial etching of oxide material, can also be carried out to modify the face 12 or the hollow chambers 14. In this way, the area ratio of the opening areas of the hollow chambers 14 to the extension area of the face 12 can be varied or increased. It is understood that other modifications of the face 12 or of the hollow chambers 14 can also be made, depending on reaction time and intensity.

A particular advantage of the proposed solution is that the face 12 can also be designed in practically any shape at all.

The figure also shows a molded article or work piece 18, likewise in a highly simplified, not true-to-scale, sectional diagram, in the already finished state, i.e., with a surface 19 already structured by the casting mold 11 after casting.

The proposed casting mold 11 allows very fine structuring of the work piece 18 or its surface 19. It is possible, for example, to create relatively large bumps of the order of 0.1 to 50 μm each with several, relatively small projections on the surface 19, for example, of the order of 10 to 400 nm, on the surface 19 of the work piece 18.

The proposed solution very easily and cost-effectively enables very fine structuring of the surface 19. Accordingly, there is a very broad area of application. For example, such especially very fine structuring can be utilized in anti-reflex layers, for altering radiation emission of structured surfaces, in sensory analysis, in catalysis, in self-cleaning surfaces, in improving surface wettability and the like.

Expressed in general terms, an essential aspect of the present invention is casting or molding a surface layer with hollow chambers formed directly or model-free by anodic oxidation, to enable surface structuring in the nanometer range.

The present invention is especially not limited to a casting mold 11 in the narrower sense. Rather, the surface layer 13 or covering layer 16 is to be understood as model for a general structuring of a surface, a tool, a work piece or the like in the nanometer range. In particular, the model may be molded in any way at all. In particular, no reshaping is required when molding. For example, with the work piece 18 to be manufactured having a structured surface 19, this can be a cast article, wherein the surface 19 is structured by casting or decanting or any molding of the mold 11.

In general, the present invention enables a simple, cost-effective stamping or molding in the nanometer range by a surface layer with hollow chambers formed by anodic oxidation being used as matrix or as casting mold.

TECHNICAL APPLICABILITY

The proposed solution very easily and cost-effectively enables very fine structuring of the surface. Accordingly, there is a very broad area of application. For example, such especially very fine structuring can be utilized in anti-reflex layers, for altering radiation emission of structured surfaces, in sensory analysis, in catalysis, in self-cleaning surfaces, in improving surface wettability and the like. In particular, the proposed solution also extends to the use of work pieces with structured surfaces that have been structured by use of the proposed stamping tool for the purposes mentioned hereinabove. Further, the proposed solution can be used for casting with practically any material, since aluminum oxide especially is highly resistant mechanically, thermally and/or chemically.

What is claimed is:

1. Method for producing a stamping tool with a structured stamping surface, comprising the steps of:

oxidizing a surface or covering layer of the stamping tool for forming the stamping surface at least partially anodally and forming open hollow chambers that are at least essentially uniformly shaped and at least essentially evenly distributed over the surface or surface area of the stamping surface without the use of a model.

2. Method according to claim 1, wherein the surface or covering layer is oxidized potentiostatically.

3. Method according to claim 1, wherein the surface layer or covering layer is oxidized with varying voltage.

4. Method according to claim 3, wherein the surface or covering layer is oxidized galvanostatically.

5. Method according to claim 1, wherein the surface or covering layer that is oxidized is formed of a material selected from the group consisting of aluminum, silicon, iron, steel and titanium.

6. Method according to claim 1, comprising the additional step of modifying the stamping surface at least one of before and after said oxidizing step for producing a rough structure.

7. Method for structuring a surface of a work piece in a nanometer range by means of a stamping tool with a structured stamping surface, comprising at least one of pressing and rolling a stamping surface, formed of an anodally oxidized surface or covering layer with open hollow chambers which have diameters in a nanometer range that have been created model-free by anodic oxidation, onto the surface to be structured.

8. Method according to claim 7, wherein the surface is first roughly structured in a first step by means of a first stamping tool and then is finely structured by means of a second stamping tool in a second step.

9. Method according to claim 8, wherein the surface is finely structured by means of said second stamping tool in said second step with a stamping force that is reduced relative to that applied with said first stamping tool.

10. Method according to claim 8, wherein the surface is finely structured by means of said second stamping tool in said second step after hardening of the surface structured by said first step.

11. Method for at least partially structuring a surface of a cast work piece, comprising the steps of: casting the work piece using a casting mold with a structured molding face having an anodally oxidized surface or covering layer with open hollow chambers created model-free by anodic oxidation.

12. Method according to claim 11, wherein the surface or covering layer is formed at least substantially of a material selected from the group consisting of aluminum oxide, silicon oxide, iron oxide, oxidized steel, and titanium oxide.

*13. Method of claim 1, wherein the open hollow chambers include diameters ranging from 10-500 nanometers.*

*14. Method of claim 1, wherein the open hollow chambers include structural widths ranging from 30-600 nanometers.*

*15. Method of claim 13, wherein the open hollow chambers include diameters ranging from 15-200 nanometers.*

*16. Method of claim 15, wherein the open hollow chambers include diameters ranging from 20-100 nanometers.*

*17. Method of claim 1, wherein the stamping tool includes open hollow chambers of a somewhat conical shape.*

*18. Method of claim 6, wherein the modifying is done by etching.*

*19. Method of claim 18, wherein the etching is chemical etching.*

*20. Method of claim 7, wherein the open hollow chambers include diameters ranging from 10-500 nanometers.*

*21. Method of claim 20, wherein the open hollow chambers include diameters ranging from 15-200 nanometers.*

*22. Method of claim 21, wherein the open hollow chambers include diameters ranging from 20-100 nanometers.*

*23. Method of claim 7, wherein the open hollow chambers include structural widths ranging from 30-600 nanometers.*

*24. Method of claim 7, wherein the stamping tool includes open hollow chambers of a somewhat conical shape.*

*25. Method of claim 1, comprising at least one additional step of modifying the hollow chambers after said oxidizing step.*

*26. Method of claim 25, wherein the modifying is done by etching.*

*27. Method according to claim 26, wherein the etching is chemical etching.*

* * * * *